US012679465B2

(12) United States Patent
Iemura et al.

(10) Patent No.: US 12,679,465 B2
(45) Date of Patent: Jul. 14, 2026

(54) VEHICLE BODY LOWER PART STRUCTURE

(71) Applicant: HONDA MOTOR CO., LTD., Tokyo (JP)

(72) Inventors: Yu Iemura, Wako (JP); Ken Yasui, Wako (JP); Masaaki Tatsuwaki, Wako (JP); Satoru Kawabe, Wako (JP); Satoshi Yaita, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 289 days.

(21) Appl. No.: 18/242,041

(22) Filed: Sep. 5, 2023

(65) Prior Publication Data

US 2024/0109594 A1 Apr. 4, 2024

(30) Foreign Application Priority Data

Sep. 30, 2022 (JP) ................................. 2022-158048

(51) Int. Cl.
*B62D 21/15* (2006.01)
*B60R 16/04* (2006.01)
(Continued)

(52) U.S. Cl.
CPC ............ *B62D 21/157* (2013.01); *B60R 16/04* (2013.01); *B62D 25/025* (2013.01);
(Continued)

(58) Field of Classification Search
CPC .............. B62D 21/157; H01M 50/249; H01M 50/204; B60R 16/04
See application file for complete search history.

(56) References Cited

U.S. PATENT DOCUMENTS 7,654,352 B2 * 2/2010 Takasaki ............. H01M 50/278
180/68.5
9,809,101 B2 11/2017 Ikeda et al.
(Continued)

FOREIGN PATENT DOCUMENTS

CN 108454370 8/2018
CN 110588312 12/2019
(Continued)

OTHER PUBLICATIONS

Japanese Office Action for Japanese Patent Application No. 2022-158048 mailed Nov. 11, 2025.
(Continued)

*Primary Examiner* — Taras P Bemko
(74) *Attorney, Agent, or Firm* — Amin, Turocy & Watson, LLP

(57) ABSTRACT

A vehicle body lower part structure includes: a side frame that connects a battery pack which is arranged below a floor panel of a vehicle to a side sill which is provided at a further outer position in a vehicle width direction than the battery pack; a lower cross member that is provided within the battery pack, is arranged between batteries, and extends in the vehicle width direction; and a connection portion that is provided within the battery pack and connects the lower cross member to the floor panel. The connection portion is provided at a further outer position in the vehicle width direction than the batteries.

10 Claims, 8 Drawing Sheets

(51) Int. Cl.

| | | |
|---|---|---|
| *B62D 25/02* | (2006.01) | |
| *H01M 50/204* | (2021.01) | |
| *H01M 50/249* | (2021.01) | |

(52) U.S. Cl.
CPC ....... *H01M 50/204* (2021.01); *H01M 50/249* (2021.01); *H01M 2220/20* (2013.01)

(56) References Cited

U.S. PATENT DOCUMENTS

| | | | | |
|---|---|---|---|---|
| 10,099,546 | B2 | 10/2018 | Hara et al. | |
| 2018/0237075 | A1 | 8/2018 | Kawabe et al. | |
| 2019/0009662 | A1 | 1/2019 | Toyota | |
| 2019/0359047 | A1 | 11/2019 | Tsuyuzaki et al. | |
| 2021/0276621 | A1 | 9/2021 | Suzaki | |
| 2021/0300481 | A1 | 9/2021 | Jeong | |
| 2022/0144063 | A1 | 5/2022 | Tatsuwaki et al. | |
| 2022/0144064 | A1* | 5/2022 | Tatsuwaki ........... | H01M 50/242 |
| 2022/0153111 | A1* | 5/2022 | Tatsuwaki ......... | H01M 10/6568 |
| 2022/0153112 | A1* | 5/2022 | Tatsuwaki ........... | H01M 50/188 |
| 2022/0258585 | A1* | 8/2022 | Yaita ................... | H01M 50/242 |
| 2022/0258620 | A1 | 8/2022 | Lemura et al. | |
| 2024/0017770 | A1 | 1/2024 | Yoshida | |
| 2024/0109594 | A1 | 4/2024 | Iemura et al. | |
| 2025/0313269 | A1* | 10/2025 | Saito ..................... | B62D 25/20 |

FOREIGN PATENT DOCUMENTS

| | | |
|---|---|---|
| CN | 114954684 | 8/2022 |
| DE | 102021106801 | 9/2022 |
| JP | 07-179185 | 7/1995 |
| JP | 3132261 | 2/2001 |
| JP | 2018-131133 | 8/2018 |
| JP | 2018-188106 | 11/2018 |
| JP | 2019-025967 | 2/2019 |
| JP | 2019-202747 | 11/2019 |
| JP | 2021-091341 | 6/2021 |
| JP | 2021-142763 | 9/2021 |
| JP | 2022-077194 | 5/2022 |
| JP | 2022-081180 | 5/2022 |
| JP | 2022-086647 | 6/2022 |
| JP | 2022-097815 | 7/2022 |
| JP | 2022-124297 | 8/2022 |
| WO | 2018/212161 | 11/2018 |

OTHER PUBLICATIONS

Non-Final Office Action for U.S. Appl. No. 18/242,551 mailed Aug. 11, 2025.
Japanese Office Action for Japanese Patent Application No. 2022-158038 mailed Aug. 26, 2025.
Chinese Office Action for Chinese Patent Application No. 202311079006.8 mailed May 1, 2026.
Chinese Office Action for Chinese Patent Application No. 202311079504.2 mailed May 14, 2026.

* cited by examiner

VEHICLE BODY LOWER PART STRUCTURE

CROSS-REFERENCE TO RELATED APPLICATION

Priority is claimed on Japanese Patent Application No. 2022-158048, filed on Sep. 30, 2022, the contents of which are incorporated herein by reference.

BACKGROUND

Field of the Invention

The present invention relates to a vehicle body lower part structure.

Background

As a vehicle body lower part structure, a structure is known in which, in a battery pack that stores a plurality of batteries, a cross member is arranged between the batteries. As a vehicle body lower part structure, a structure is known in which a cross member is connected via a collar and a reinforcement member to a side frame and a floor portion. The reinforcement member is formed in a U shape in a cross-section and thereby has a front wall and a rear wall. The widths of the front wall and the rear wall are enlarged inward in a vehicle width direction toward a downward side. Further, the side frame is connected to a side sill via the floor portion.

Therefore, for example, when a collision load is input to the side sill by a side collision such as a pole side collision, the reinforcement member can prevent the side frame from falling inward in the vehicle width direction by the input collision load, and it is possible to ensure collision safety performance (for example, refer to Japanese Unexamined Patent Application, First Publication No. H7-179185).

SUMMARY

Here, when the battery pack including a large-sized battery is connected to the side sill, the cross member and the floor portion are fastened together at a position separated inward in the vehicle width direction from the side sill. Therefore, when a collision load is input, it is possible to enhance the absorption efficiency of collision energy.

However, it is conceivable that by fastening the cross member to the floor portion at the position separated inward in the vehicle width direction from the side sill, when the collision load is input to the side sill, the side frame connected to the side sill is deformed upward and comes into contact with the battery. Therefore, there is room for improvement in terms of collision safety performance.

An aspect of the present invention aims at providing a vehicle body lower part structure capable of enhancing the absorption efficiency of collision energy and capable of preventing a side frame from coming into contact with a battery. The aspect of the present invention aims at providing a vehicle body lower part structure that can improve collision safety performance and can contribute to the development of a sustainable transportation system.

A vehicle body lower part structure according to an aspect of the present invention includes: a side frame that connects a battery pack which is arranged below an upper member of a vehicle to a side sill which is provided at a further outer position in a vehicle width direction than the battery pack;

a cross member that is provided within the battery pack, is arranged between batteries, and extends in the vehicle width direction; and a connection portion that is provided within the battery pack and connects the cross member to the upper member, wherein the connection portion is provided at a further outer position in the vehicle width direction than the batteries.

According to such a configuration, the battery pack is connected to the side sill via the side frame, and the battery pack (in particular, the battery) can be arranged to be separated inward in the vehicle width direction from the side sill. Therefore, for example, when a collision load is input to the side sill by a side collision such as a pole side collision, a region between the battery and the side sill is deformed by the collision load, and it is possible to absorb collision energy. Thereby, it is possible to enhance the absorption efficiency of collision energy with respect to the collision load input to the side sill. Therefore, according to the present vehicle body lower part structure, it is possible to improve collision safety performance, and it is possible to contribute to the development of a sustainable transportation system. Hereinafter, a side collision such as a pole side collision may be simply abbreviated as a "side collision".

The cross member is connected to the upper member by the connection portion, and the connection portion is provided at a further outer position in the vehicle width direction than the battery. Therefore, an outer region in the vehicle width direction than the battery can be pressed from above via the cross member by the connection portion.

Thereby, when the collision load is input to the side sill by the side collision, the connection portion and the cross member can prevent the side frame that connects the battery pack to the side sill from being deformed upward. Accordingly, it is possible to prevent the side frame from coming into contact with the battery.

The vehicle body lower part structure according to the aspect described above may include: a battery frame that connects the batteries of the battery pack and extends in a vehicle forward-rearward direction, wherein at least part of the connection portion may be provided at a position aligned in the vehicle forward-rearward direction with the battery frame.

According to such a configuration, at least part of the connection portion is provided at the position aligned with the battery frame in the forward-rearward direction. Therefore, the connection portion can prevent the battery frame from being deformed upward by a collision load. Accordingly, it is possible to prevent the battery frame from coming into contact with the battery.

In the aspect described above, the connection portion may include a beam section that extends outward in the vehicle width direction.

According to such a configuration, the connection portion includes the beam section, and the beam section extends outward in the vehicle width direction.

Thereby, the beam section can prevent the battery frame from being deformed upward by a collision load.

By providing the beam section on the connection portion, a connection main body section of the connection portion that connects the cross member to the upper member can be arranged at an inner position in the vehicle width direction relative to the beam section. Thereby, it is possible to enhance the degree of freedom of design when the position of the connection main body section is determined.

In the aspect described above, the beam section may be an enlarged width section having a width that is enlarged outward in a width direction toward a downward side.

According to such a configuration, the beam section is the enlarged width section, and the enlarged width section is formed to have a width that is enlarged outward in the width direction toward the downward side. Therefore, at the enlarged width section, a lower end at the outside in the vehicle width direction can extend to the same position as an outer end in the vehicle width direction of the beam section. Thereby, the enlarged width section can prevent the battery frame from being deformed upward by a collision load.

By forming the enlarged width section to have a width that is enlarged outward in the width direction toward the downward side, the shape of the enlarged width section can be made smaller relative to the beam section. Thereby, the weight of the connection portion (that is, the vehicle) can be reduced, and it is possible to contribute to ensuring of a cruising distance of the vehicle.

In the aspect described above, the connection portion may include, in addition to the enlarged width section, another enlarged width section having a width that is enlarged inward in the width direction toward the downward side, and the enlarged width section may extend further greatly in the vehicle width direction than the other enlarged width section.

According to such a configuration, the other enlarged width section added to the connection portion can be in contact with the cross member at the inside in the vehicle width direction. Additionally, the enlarged width section extends further greatly in the vehicle width direction than the other enlarged width section. Thereby, it is possible to further enhance the rigidity of the connection portion against a collision load. Accordingly, the enlarged width section can further favorably prevent the battery frame from being deformed upward by the collision load.

In the aspect described above, the side frame may include a hollow portion in which a hollow cell is formed, the battery frame may be arranged to be separated inward in the vehicle width direction from the hollow portion, and the enlarged width section may extend further outward in the vehicle width direction than an outer end portion in the vehicle width direction of the battery frame.

According to such a configuration, by forming the hollow cell in the hollow portion of the side frame, the rigidity of the hollow portion is enhanced. The battery frame is arranged to be separated inward in the vehicle width direction from the hollow portion. Further, the enlarged width section of the connection portion extends further outward in the vehicle width direction than the outer end portion in the vehicle width direction of the battery frame. Therefore, the enlarged width section of the connection portion can extend to a position close to the hollow portion of the side frame. Thereby, for example, the enlarged width section can further favorably prevent the hollow portion of the side frame from being deformed upward by a collision load due to a side collision.

On the other hand, when the collision load of the side collision is input, in a vehicle body forward-rearward direction, a region between the battery and the hollow portion excluding the connection portion can be deformed to be capable of absorbing the collision energy in a state where upward deformation is prevented. That is, it is possible to ensure a deformation stroke required for absorbing the collision energy by the region between the battery and the hollow portion excluding the connection portion.

Thereby, when the collision load of the side collision is input, the region between the battery and the hollow portion excluding the connection portion is deformed, and the collision energy can be absorbed while preventing, by the enlarged width section, the hollow portion of the side frame from being deformed upward and coming into contact with the battery.

In the aspect described above, an outer end portion in the vehicle width direction of the enlarged width section may be arranged to be separated from the hollow portion.

Here, the connection portion is formed to have high rigidity in order to support the battery pack to the upper member. Therefore, for example, it is conceivable that when the outer end portion in the vehicle width direction of the enlarged width section is in contact with the hollow portion, a collision load at a collision initial stage in a side collision may be input through the connection portion to an arrangement position of the battery.

Therefore, in this configuration, the outer end portion in the vehicle width direction of the enlarged width section is arranged to be separated inward in the vehicle width direction from the hollow portion. Thereby, when the collision load of the side collision is input, the collision load that is input to the arrangement position of the battery at the collision initial stage of the side collision can be reduced in addition to preventing upward deformation of the hollow portion of the side frame.

In the aspect described above, the side frame may include a first joint flange that is joined to the battery pack, and the first joint flange may be arranged at a further inner side in the vehicle width direction than the outer end portion in the vehicle width direction of the enlarged width section such that a second joint flange that is joined to the battery pack of the battery frame overlaps an upper side in an upward-downward direction of the first joint flange.

According to such a configuration, the second joint flange and the first joint flange are arranged at a further inner side in the vehicle width direction than the outer end portion in the vehicle width direction of the enlarged width section such that the second joint flange overlaps the upper side of the first joint flange. Therefore, the first connection flange can be pressed from above by the second connection flange and the enlarged width section. Here, the first joint flange and the second joint flange are formed to accept deformation with respect to a collision load. Hereinafter, a region including the first joint flange and the second joint flange may be referred to as a "collision absorption portion".

Thereby, for example, when a collision load is input to the first joint flange of the side frame by a side collision, the collision absorption portion between the hollow portion of the side frame and the battery can be deformed downward.

A space that receives deformation of the collision absorption portion can be ensured below the collision absorption portion. Thereby, it is possible to prevent a section that is not collapsed from being generated at the collision absorption portion, and it is possible to enhance the absorption efficiency of collision energy. Further, by deforming the collision absorption portion downward, it is possible to prevent the collision absorption portion from coming into contact with the battery arranged within the battery pack.

In the aspect described above, the battery frame may include a protrusion portion that protrudes upward from a bend portion formed on an inner end portion in the vehicle width direction of the second joint flange, an edge portion on the battery side of the first joint flange may extend to the bend portion side, and the edge portion may include a first joint section that is joined to the battery pack.

According to such a configuration, the edge portion of the first joint flange extends to the bend portion side (that is, to the inside in the vehicle width direction) of the second joint flange, and the first joint section of the edge portion is joined to the battery pack. Therefore, the collision load can be transmitted to the bend portion (that is, the battery frame) of the second joint flange. Thereby, the bend portion can be a base point of folding with respect to a collision load, and the first joint flange can be further reliably deformed (bent) downward together with the battery frame.

In the aspect described above, the second joint flange may include a second joint section that is joined to the battery pack, and the first joint section may be arranged closer to the battery than the second joint section.

According to such a configuration, the second joint section of the second joint flange is joined to the battery pack, and the first joint section is arranged closer to the battery (that is, at the inside in the vehicle width direction) than the second joint section. The second joint flange is arranged at the upper side of the battery pack. The first joint flange is arranged at the lower side of the battery pack. Thereby, it is possible to prevent the first joint flange from coming into contact directly with the battery.

Specifically, for example, it is also conceivable that when an excessive collision load is input to the first joint flange of the side frame by a side collision, the first joint flange may be deformed upward. Even in this case, the edge portion (that is, the first joint section) is in contact with the battery frame. Therefore, the battery frame can prevent the first joint flange from being greatly deformed upward. Thereby, the battery can be protected by the battery frame.

In the aspect described above, the protrusion portion of the battery frame may include a plurality of recess sections that are joined to the battery pack along a vehicle forward-rearward direction.

According to such a configuration, the protrusion portion includes the recess section that is joined to the battery pack, and the recess section can be arranged at the middle side in the width direction of the protrusion portion. Therefore, the rigidity at the middle side in the width direction of the protrusion portion can be enhanced by the recess section, and a strength difference can be provided relative to an outer region (that is, a region on the bend portion side) in the width direction. Thereby, the bend portion can be further reliably used as a base point of folding, and the first joint flange can be further reliably deformed (bent) downward.

In the aspect described above, the side frame may include: a horizontal portion that is fixed to a lower portion of the side sill; and a vertical portion that connects the horizontal portion to the first joint flange, the horizontal portion and the vertical portion may be formed as a hollow portion having a substantially L shape in a cross-section that includes a plurality of hollow cells, and the second joint flange of the battery frame may be arranged at a position that is separated inward in the vehicle width direction from the vertical portion.

According to such a configuration, the horizontal portion and the vertical portion of the side frame are formed as the hollow portion having a substantially L shape in a cross-section, and the plurality of hollow cells are included in the hollow portion. The hollow portion is formed to have high rigidity against a collision load that is input by a side collision. Therefore, by separating the second joint flange of the battery frame inward in the vehicle width direction relative to the vertical portion (that is, the hollow portion), the battery frame and the hollow portion can be spaced from each other. Thereby, a deformation margin of the collision absorption portion against the collision load that is input by the side collision can be suitably ensured, and it is possible to further increase the absorption amount of collision energy.

In the aspect described above, a lower surface of the horizontal portion may be formed such that a thickness of an inner region formed on the vertical portion side is thinner than an outer region formed on an outside in the vehicle width direction.

According to such a configuration, when a collision load is input by a side collision, the inner region on the vertical portion side can be actively deformed at the lower surface of the horizontal portion by the collision load. Therefore, a boundary portion between the vertical portion and the first joint flange can be deformed upward by the collision load. Thereby, the side frame can be suitably deformed, and it is possible to further increase the absorption amount of collision energy.

In the aspect described above, a lower surface of the horizontal portion may be arranged at a lower position than a lower surface of the battery pack, a lower surface of the vertical portion may be formed in an inclination form having an upward gradient toward the first joint flange from the lower surface of the horizontal portion, and the lower surface of the vertical portion may connect the lower surface of the horizontal portion to the first joint flange.

According to such a configuration, the lower surface of the horizontal portion is arranged at a lower position than the lower surface of the battery pack. Therefore, it is possible to prevent the hollow portion of the side frame from falling to a room inside by a collision load that is input by a side collision. Thereby, the first joint flange of the side frame can be further reliably deformed downward.

According to an aspect of the present invention, it is possible to enhance the absorption efficiency of collision energy, and it is possible to prevent the side frame from coming into contact with the battery.

DESCRIPTION OF EMBODIMENTS

Figure 1:
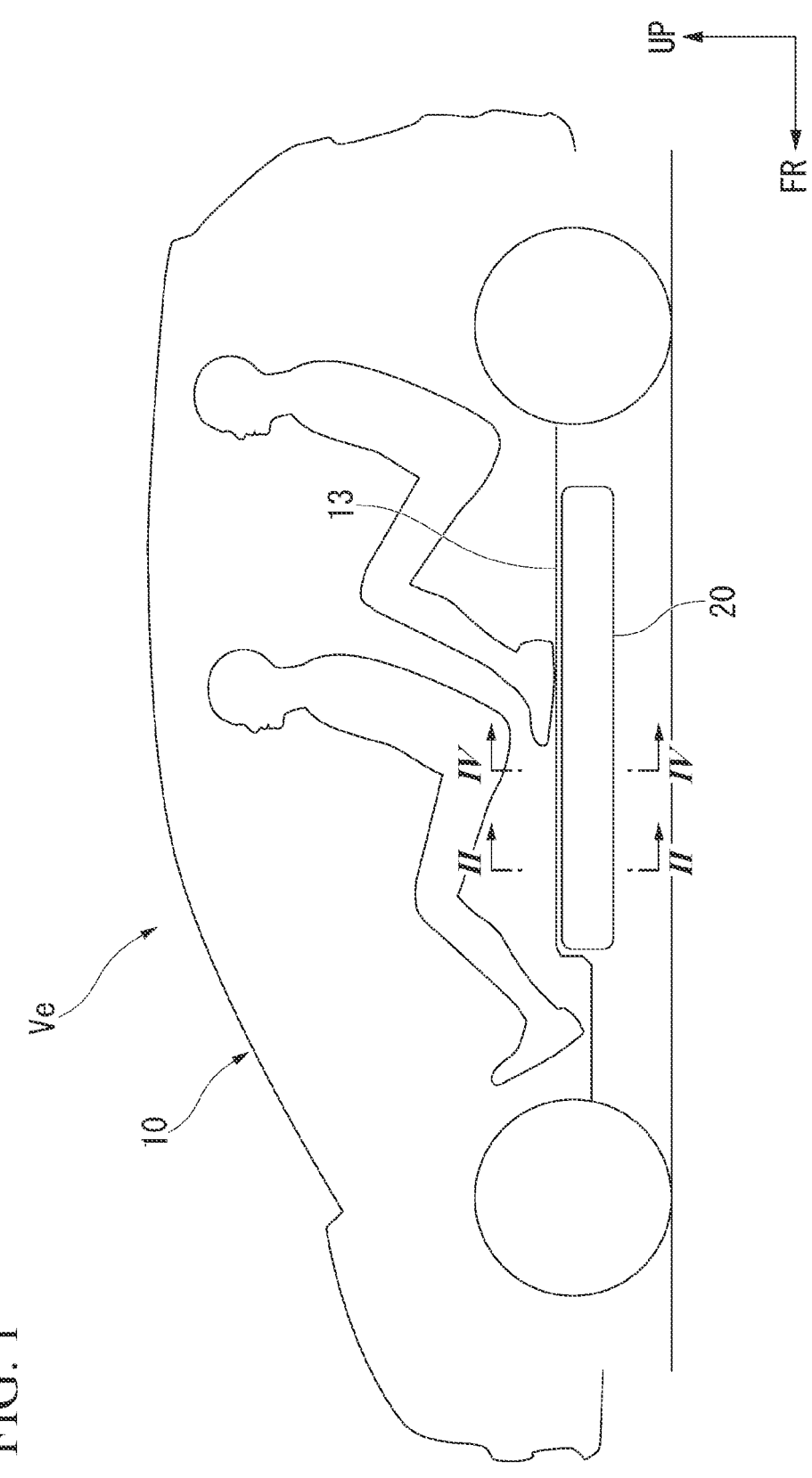
FIG. 1 is a schematic view showing a battery pack mount vehicle that includes a vehicle body lower part structure in an embodiment of the present invention when seen from a leftward direction.

Hereinafter, a battery pack mount vehicle having a vehicle body lower part structure according to an embodiment of the present invention will be described with reference to the drawings. In the drawings, an arrow FR indicates a vehicle forward direction, an arrow UP indicates a vehicle upward direction, and an arrow LH indicates a vehicle leftward direction. The battery pack mount vehicle has a structure that is generally symmetric in a leftward-rightward direction.

Accordingly, the following embodiment is described using the same reference numerals for the left and right configuration members.

Figure 2:
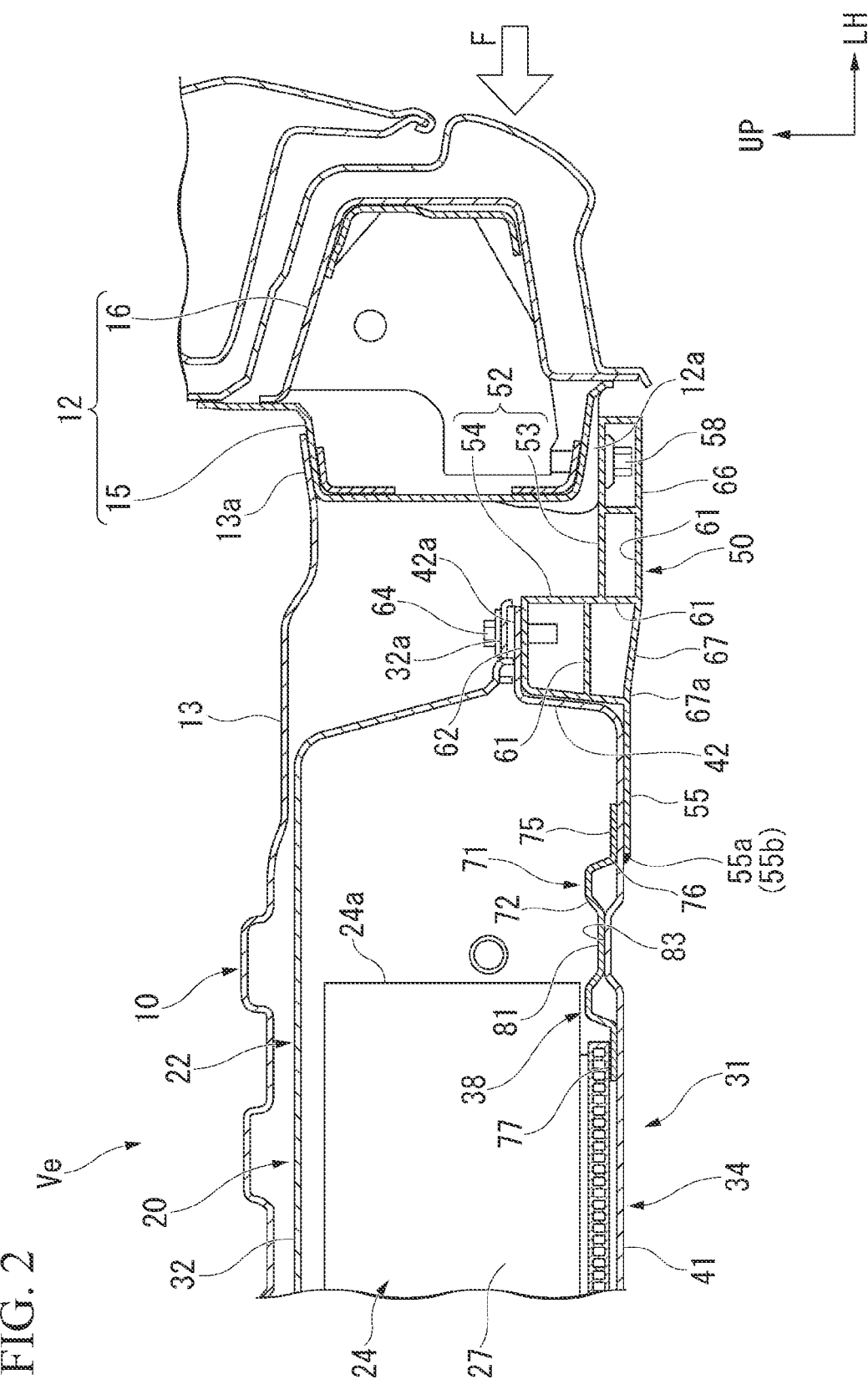
FIG. 2 is a cross-sectional view along a II-II line of FIG. 1.

FIG. 1 is a schematic view showing a battery pack mount vehicle Ve that includes a vehicle body lower part structure when seen from a leftward direction. FIG. 2 is a cross-sectional view along a II-II line of FIG. 1.

As shown in FIG. 1 and FIG. 2, the battery pack mount vehicle Ve includes: a vehicle body 10; a battery pack 20 that is arranged at a lower middle of the vehicle body 10; and a left side frame 50 and a right side frame 50 that connect the battery pack 20 and the vehicle body 10. Hereinafter, the battery pack mount vehicle Ve may be abbreviated as a "vehicle Ve".

<Vehicle Body>

The vehicle body 10 includes a left side sill (side sill) 12, a right side sill (side sill, not shown), and a floor portion (upper member) 13.

The left side sill 12 and the right side sill (not shown) have a configuration that is generally symmetric in the leftward-rightward direction.

Therefore, the following embodiment is described by abbreviating the left side sill 12 as a "side sill", and description of the right side sill (not shown) is omitted.

In the side sill 12, a closed cross-section is formed by overlapping open sides of an inner panel 15 and an outer panel 16 that are formed in a C shape when seen from a vehicle forward-rearward direction with each other. The inner panel 15 is arranged at an inside in a vehicle width direction, and the outer panel 16 is arranged at a left outside in the vehicle width direction. The side sill 12 is a member having high rigidity that constitutes part of a skeleton of the vehicle body 10. The side sill 12 is provided at the left outside in the vehicle width direction (at the outside in the vehicle width direction) relative to the battery pack 20.

The side sill 12 extends in the vehicle forward-rearward direction along the left outside in the vehicle width direction of the floor portion 13.

A left outer section 13a of the floor portion 13 is provided on the side sill 12. The floor portion 13 forms a floor of the vehicle body 10.

The battery pack 20 is fixed to the side sill 12, the floor portion 13, and the like. The side sill 12, the floor portion 13, the battery pack 20, and the like constitute the vehicle body lower part structure.

<Battery Pack>

Figure 3:
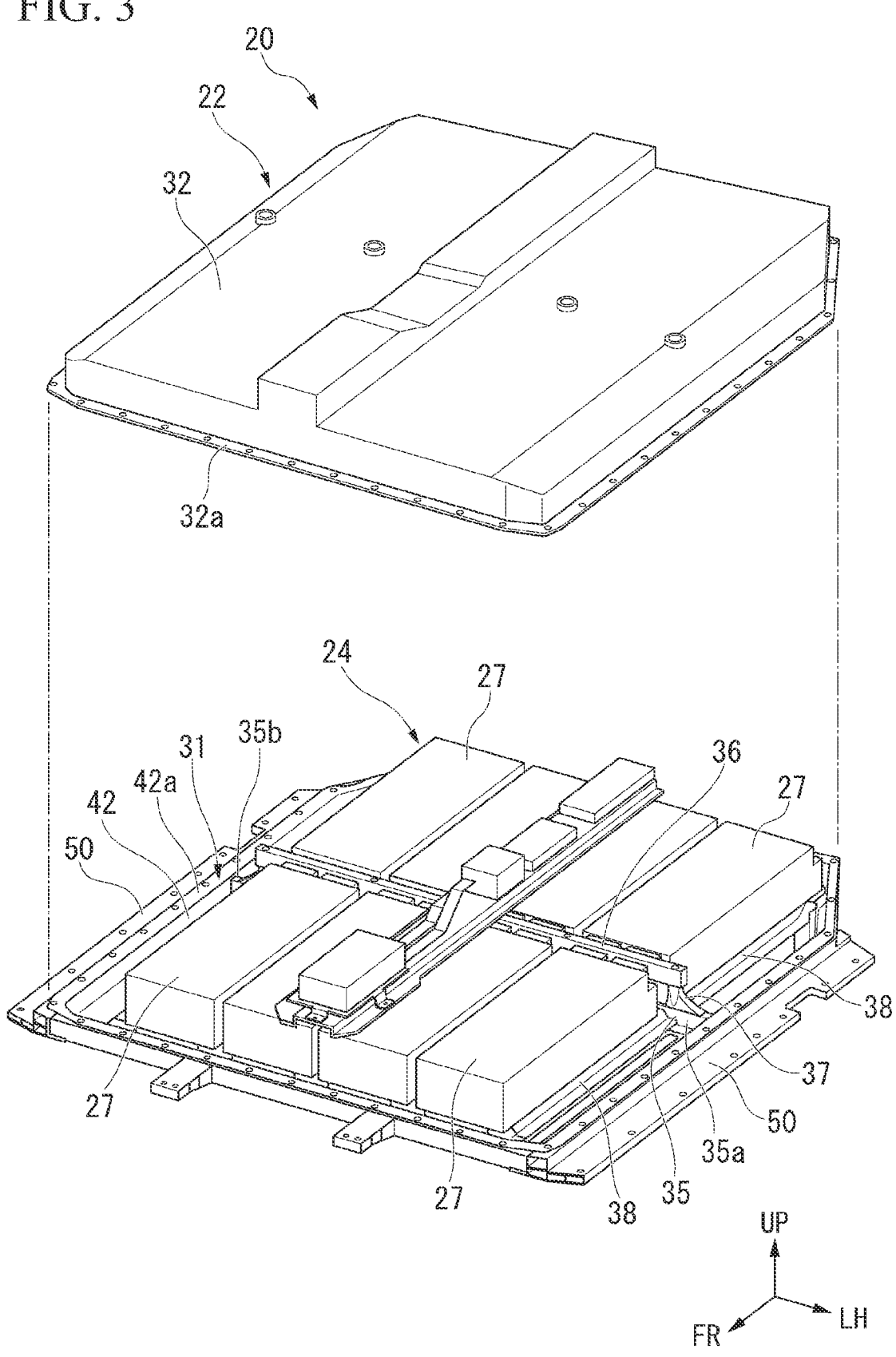
FIG. 3 is a perspective view showing a state in which a case cover is disassembled from a battery pack in the embodiment of the present invention.

FIG. 3 is a perspective view showing a state in which a case cover 32 is disassembled from the battery pack 20.

As shown in FIG. 2 and FIG. 3, the battery pack 20 is arranged below the floor portion 13 (that is, below the floor of the vehicle Ve shown in FIG. 1). The battery pack includes a battery case 22 and a battery module 24.

<Battery Case>

The battery case 22 includes: a case main body 31; and a case cover 32 that covers the case main body 31 from above, opens at the case main body 31 side, and has a box shape. The case main body 31 includes: a case portion 34 that is provided below the battery module 24; a lower cross member (cross member) 35 that is provided on the case portion 34; an upper cross member 36 that is arranged above the lower cross member 35; a plurality of connection portions 37 that connect the upper cross member 36 arranged above the lower cross member 35; and a plurality of battery frames 38 that support the battery module 24.

The case portion 34 has a case bottom portion 41 and a case circumferential wall 42. The case bottom portion 41 is arranged below the battery module 24. The case bottom portion 41 is formed in a substantially rectangular shape in plan view. The case bottom portion 41 forms a bottom portion of the battery case 22.

The case circumferential wall 42 is formed along an outer circumference of the case bottom portion 41. A flange portion 42a is formed integrally on the case circumferential wall 42 such that the flange portion 42a extends outward. A flange portion 32a of the case cover 32 is arranged so as to overlap the flange portion 42a. The lower cross member 35, the upper cross member 36, the plurality of connection portions 37, and the plurality of battery frames 38 are provided within the battery pack 20.

Figure 4:
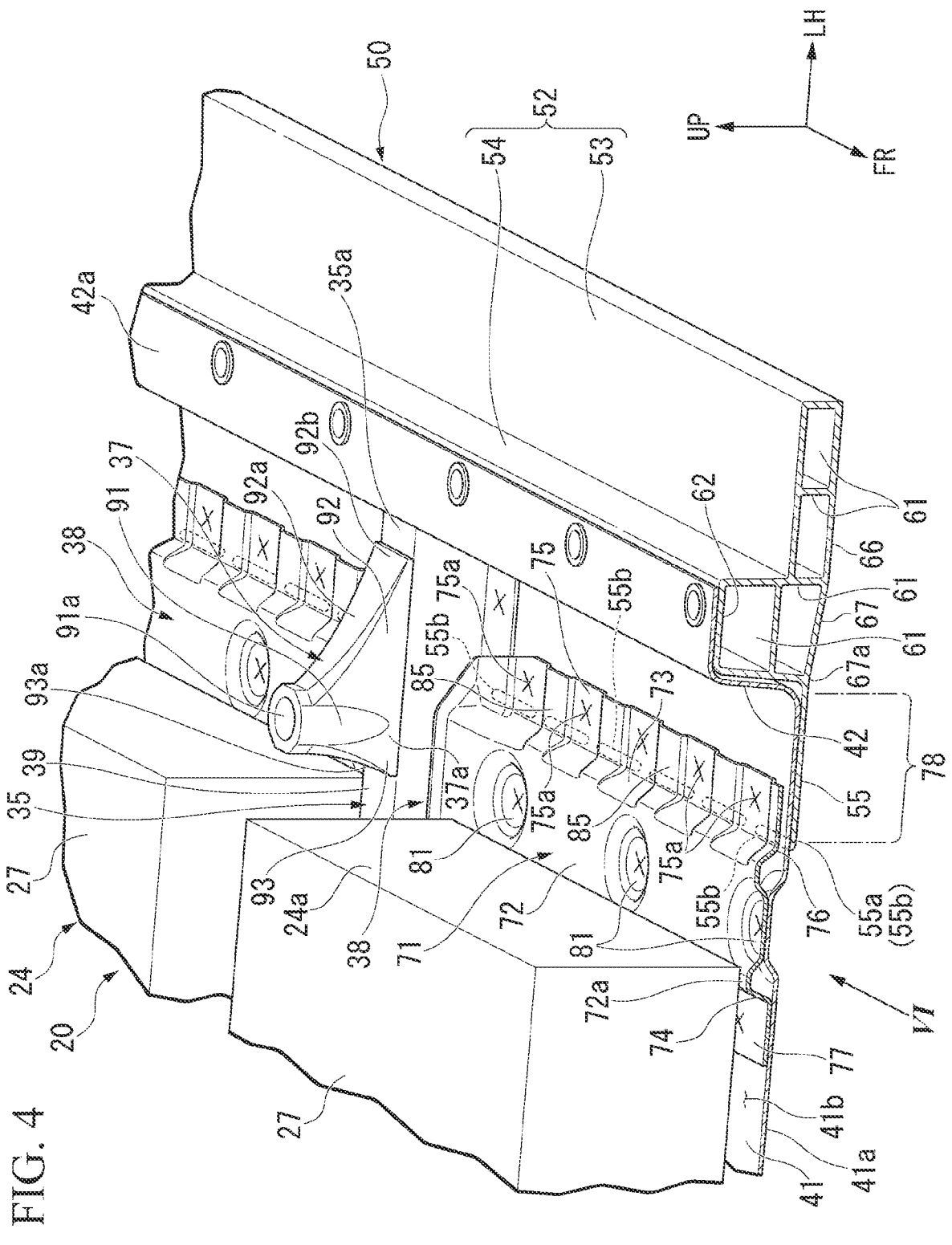
FIG. 4 is a broken perspective view along a IV-IV line of FIG. 1.
Figure 5:
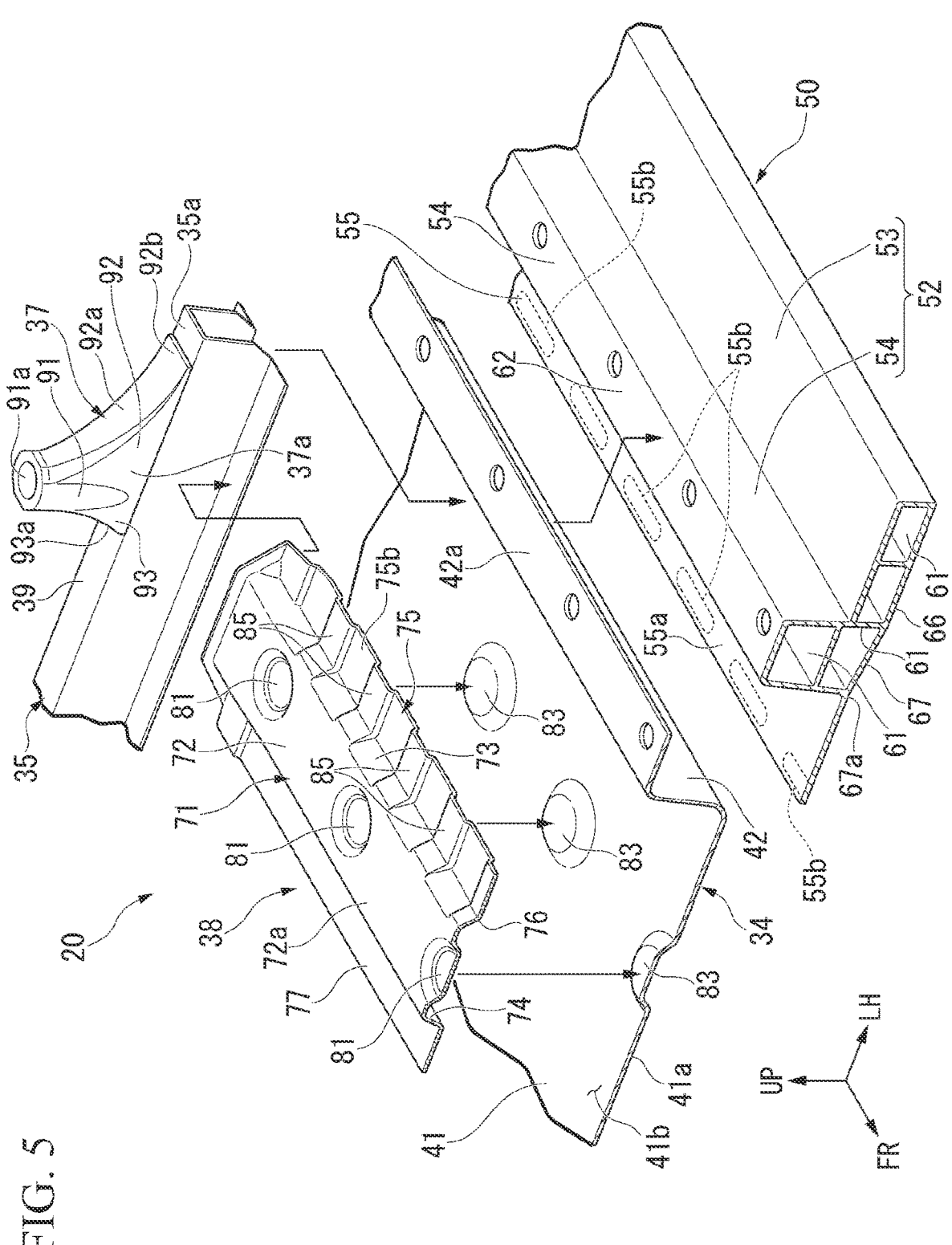
FIG. 5 is a perspective view in which a lower cross member, a battery frame, and a side frame are disassembled from a battery case in the embodiment of the present invention.

FIG. 4 is a broken perspective view along a IV-IV line of FIG. 1. FIG. 5 is a perspective view in which the lower cross member 35, the battery frame 38, and the side frame 50 are disassembled from the battery case 22.

As shown in FIG. 4 and FIG. 5, the lower cross member 35 is provided on the case portion 34 (particularly, the case bottom portion 41). The lower cross member 35 is arranged at a middle in the vehicle forward-rearward direction in the case portion 34 and extends toward the vehicle width direction. For example, a right end portion 35a of the lower cross member 35 is in contact with a right wall of the case circumferential wall 42. For example, a left end portion 35a (refer to FIG. 3) of the lower cross member 35 is in contact with a left wall of the case circumferential wall 42. The plurality of battery frames 38 are provided on the case bottom portion 41 at a vehicle body forward position and a vehicle body rearward position of the lower cross member 35.

The upper cross member 36 is arranged above the lower cross member 35 and is provided along the lower cross member 35. The plurality of connection portions 37 are interposed between the upper cross member 36 and the lower cross member 35 such that the connection portions 37 are spaced from each other in the vehicle width direction.

The plurality of connection portions 37 are members that connect the lower cross member 35 to the upper cross member 36 in an upward-downward direction. Only the connection portion 37 on the left outside in the vehicle width direction of the plurality of connection portions 37 is shown in the drawings.

The upper cross member 36, the plurality of connection portions 37, and the lower cross member 35 are joined together by an attachment bolt (not shown) that penetrates through the upper cross member 36, the plurality of connection portions 37, and the lower cross member 35. In this state, the upper cross member 36 fixes the battery module 24 from above.

The lower cross member 35, the plurality of connection portions 37, and the upper cross member 36 are connected in the upward-downward direction to the floor portion 13 (refer to FIG. 2) and a floor frame (not shown) by a fastening member 45 (refer to FIG. 6) such as a bolt and a nut. The floor frame (not shown) is a member having high rigidity that is joined to an upper surface of the floor portion 13. The battery frame 38 is described later.

In other words, the plurality of connection portions 37 connect the lower cross member 35 to the floor portion 13 via the upper cross member 36 and the floor frame (not shown) and thereby support the battery pack 20 to the floor portion 13. Therefore, the connection portion 37 is formed to have high rigidity.

The connection portion 37 that is arranged on the left side in the vehicle width direction of the plurality of connection portions 37 will be described later in detail. Further, the battery frame 38 will be also described later.

<Side Frame>

As shown in FIG. 2 and FIG. 3, by connecting the battery pack 20 to the left side sill 12, the left side frame 50 can arrange the battery pack 20 such that the battery pack 20 is separated inward in the vehicle width direction from the side sill 12. By connecting the battery pack 20 to the right side sill 12 (not shown), the right side frame 50 can arrange the battery pack 20 such that the battery pack 20 is separated inward in the vehicle width direction from the side sill 12. The left side frame 50 and the right side frame 50 have a configuration that is generally symmetric in the leftward-rightward direction. Therefore, the following embodiment is described by abbreviating the left side frame 50 as the "side frame 50", and description of the right side frame 50 is omitted.

As shown in FIG. 2, FIG. 4, and FIG. 5, the side frame 50 is arranged to be spaced to the left side in the vehicle width direction from a left side 24a (left outer side of the battery 27 described later) of the battery module 24. The side frame 50 extends in the vehicle forward-rearward direction along the side sill 12 and the battery pack 20.

The side frame 50 includes: a horizontal portion 53 that is fixed to a lower portion 12a (specifically, a lower portion of the inner panel 15) of the side sill 12; a vertical portion 54 that is fixed to the battery pack 20; and a first joint flange 55 that is joined to the battery pack 20.

An outer section of the horizontal portion 53 is fixed to the lower portion 12a of the inner panel 15 by a fastening member 58 such as a bolt and a nut. The vertical portion 54 is formed integrally on an inner section of the horizontal portion 53 and stands upward. The horizontal portion 53 and the vertical portion 54 are formed as a hollow portion 52 having a substantially L shape in a cross-section. A plurality of hollow cells 61 are formed (included) in the hollow portion 52. Therefore, the hollow portion 52 is formed to have high rigidity.

The flange portion 42a of the case main body 31 and the flange portion 32a of the case cover 32 are fixed to a top section 62 of the vertical portion 54 by a fastening member 64 such as a bolt and a nut. The vertical portion 54 is interposed between the horizontal portion 53 and the first joint flange 55 in the vehicle width direction and connects the horizontal portion 53 to the first joint flange 55.

The first joint flange 55 is formed integrally with an inner portion 67a in a lower surface section (lower surface) 67 of the vertical portion 54. The first joint flange 55 extends inward in the vehicle width direction from the inner portion 67a. The first joint flange 55 is joined to the case bottom portion (that is, a lower surface of the battery pack 20) 41 of the battery pack 20 from below.

Specifically, the first joint flange 55 has an edge portion 55a on the battery module 24 side (that is, at the inside in the vehicle width direction). The edge portion 55a includes a first joint section 55b that is joined to a lower surface 41a of the case bottom portion 41. The first joint section 55b is joined to the lower surface 41a of the case bottom portion 41 from below by mig welding, laser welding, or the like. That is, the first joint flange 55 is arranged on the lower side of the case bottom portion 41. Therefore, the battery pack 20 and the side sill 12 are connected by the side frame 50.

Figure 6:
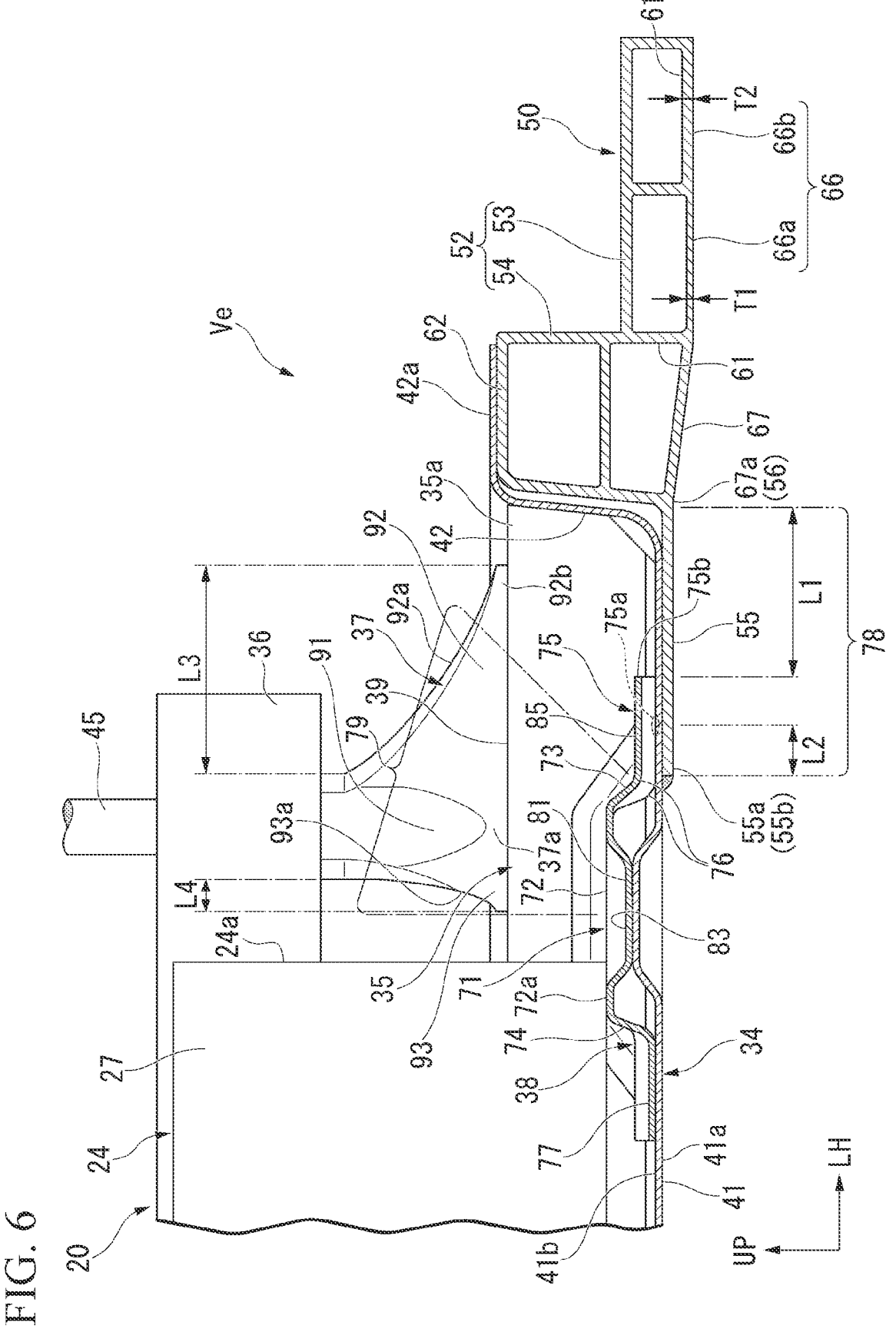
FIG. 6 is a cross-sectional view of FIG. 4 when seen from an arrow VI direction.

FIG. 6 is a cross-sectional view when seen from an arrow VI direction of FIG. 4.

As shown in FIG. 2 and FIG. 6, the horizontal portion 53 has a lower surface section (lower surface) 66 formed to be flat on the lower side of the hollow cell 61. The lower surface section 66 includes: an inner region 66a formed at the vertical portion 54 side; and an outer region 66b formed at the outside in the vehicle width direction. The inner region 66a is formed such that a thickness T1 is thinner than a thickness T2 of the outer region 66b.

Further, in the horizontal portion 53, the lower surface section 66 is arranged at a lower position than the case bottom portion 41. In the vertical portion 54, the lower surface section 67 is formed to be inclined at an upward gradient toward the first joint flange 55 from the lower surface section 66 of the horizontal portion 53. Therefore, the first joint flange 55 and the lower surface section 66 of the horizontal portion 53 are connected by the inclined lower surface section 67. The reason the wall thickness T1 of the inner region 66a is formed to be thinner than the wall thickness T2 of the outer region 66b and the reason the lower surface section 66 of the horizontal portion 53 is arranged at a lower position than the case bottom portion 41 will be described in detail later.

<Battery Module>

As shown in FIG. 3 and FIG. 4, the battery module 24 includes: a plurality of front batteries (battery) 27 arranged at a vehicle body forward side of the lower cross member 35 extending in the vehicle width direction; and a plurality of rear batteries (battery) 27 arranged at a vehicle body rear-ward side of the lower cross member 35. That is, the lower cross member 35 that extends in the vehicle width direction is arranged between the front battery 27 and the rear battery 27.

The front battery 27 and the rear battery 27 are formed in a rectangle shape in plan view and are arranged within the battery pack 20 such that the long side is directed in the vehicle forward-rearward direction. The plurality of front batteries 27 and the plurality of rear batteries 27 are arranged in a row in the vehicle width direction, respectively.

The plurality of arranged front batteries 27 and the plurality of arranged rear batteries 27 constitute, for example, the battery module 24 for driving.

The lower cross member 35, the plurality of connection portions 37, and the upper cross member 36 are arranged between the front battery 27 and the rear battery 27. Here-inafter, the front battery 27 and the rear battery 27 may be abbreviated as a "battery 27".

<Connection Portion>

As shown in FIG. 4 to FIG. 6, the connection portion 37 is fixed to a left outer section in the vehicle width direction of a top portion 39 of the lower cross member 35 by the fastening member 45. The connection portion 37 is provided at a left outer side in the vehicle width direction (outside in the vehicle width direction) than the battery 27. At least a section 37a of the connection portion 37 is provided at a position aligned in the vehicle forward-rearward direction (forward-rearward direction) with the battery frame 38.

The connection portion 37 includes: a connection main body section 91 in which a penetration hole 91a is formed; a first enlarged width section (enlarged width section) 92 that extends outward in the vehicle width direction from the connection main body section 91; and a second enlarged width section (another enlarged width section) 93 that extends inward in the vehicle width direction from the connection main body section 91. The penetration hole 91a is a hole through which the fastening member 45 penetrates in the upward-downward direction.

The embodiment is described using an example in which the connection portion 37 is formed of the connection main body section 91, the first enlarged width section 92, and the second enlarged width section 93. However, the connection portion 37 may be formed of only the connection main body section 91. Alternatively, the connection portion 37 may be formed of the connection main body section 91 and the first enlarged width section 92.

The first enlarged width section 92 is formed in a substantially triangle shape such that the width is enlarged in a left outer side in the vehicle width direction (outward in the vehicle width direction) by an extension amount L3 toward a downward side. By forming the first enlarged width section 92 in a substantially triangle shape, the shape of the first enlarged width section 92 can be made smaller, for example, as compared to the case in which the first enlarged width section 92 extends in a beam shape. By forming an inclination surface 92a of the first enlarged width section 92 in a curved shape so as to be recessed downward, the shape of the first enlarged width section 92 can be made further small.

The first enlarged width section 92 extends to a left outer side in the vehicle width direction (further outward in the vehicle width direction) than a flange outer end portion (an outer end portion in the vehicle width direction of the battery frame 38) 75b at the left outer side in the vehicle width direction of a second joint flange 75 of the battery frame 38. In the first enlarged width section 92, an enlarged width outer end portion (an outer end portion in the vehicle width direction of the enlarged width section 92) 92b is arranged to be separated inward in the vehicle width direction from the hollow portion 52.

The second enlarged width section 93 is formed in a substantially triangle shape such that the width is enlarged inward in the width direction by an extension amount L4 toward a downward side. By forming the second enlarged width section 93 in a substantially triangle shape, the shape of the second enlarged width section 93 can be made small. By forming an inclination surface 93a of the second enlarged width section 93 in a curved shape so as to be recessed downward, the shape of the second enlarged width section 93 can be made further small.

The extension amount L3 of the first enlarged width section 92 is larger than the extension amount L4 of the second enlarged width section 93. That is, the first enlarged width section 92 extends further greatly in the vehicle width direction than the second enlarged width section 93.

<Battery Frame>

Hereinafter, the battery frame 38 of the case main body 31 and the first joint flange 55 of the side frame 50 are described based on FIG. 4 to FIG. 6.

As shown in FIG. 4 to FIG. 6, the battery frame 38 is connected to the battery 27 of the battery pack 20 and extends in the vehicle forward-rearward direction. The battery frame 38 includes: a protrusion portion 71 that protrudes upward from the case bottom portion 41; the second joint flange 75 that extends from an outer lower end of the protrusion portion 71; a bend portion 76 that is formed on inner end portion in the vehicle width direction of the second joint flange 75; and a third joint flange 77 that extends from an inner lower end of the protrusion portion 71.

The protrusion portion 71 includes: a top section 72 that is arranged to be spaced upward from the case bottom portion 41; an outer surface section 73 that is bent downward from an outer edge of the top section 72; and an inner surface section 74 that is bent downward from an inner side of the top section 72. The outer surface section 73 is a region that forms an outer side surface in the vehicle width direction of the protrusion portion 71. The inner surface section 74 is a region that forms an inner side surface in the vehicle width direction of the protrusion portion 71. The protrusion portion 71 is formed in a U shape in a cross-section of the top section 72, the outer surface section 73, and the inner surface section 74.

The second joint flange 75 extends outward in the vehicle width direction along an upper surface 41b of the case bottom portion 41 from a lower side of the outer surface section 73. The second joint flange 75 is joined to the upper surface 41b of the case bottom portion 41. Therefore, the second joint flange 75 is arranged on an upper side of the case bottom portion 41. The second joint flange 75 is arranged at a further inner side in the vehicle width direction than the enlarged width outer end portion 92b of the enlarged width section 92 in an overlapping form so as to overlap the upper side of the first joint flange 55 of the side frame 50 in the upward-downward direction via the case bottom portion 41.

A first region in which the first joint flange 55, the case bottom portion 41, and the second joint flange 75 overlap one another is formed to accept deformation with respect to a collision load. A second region in which the first joint flange 55 and the case bottom portion 41 overlap each other is also formed to accept deformation with respect to a collision load. Hereinafter, a region that includes the first region and the second region may be referred to as a "collision absorption portion 78".

The second joint flange 75 is arranged at a position separated by a distance L1 inward in the vehicle width direction relative to the vertical portion 54 (that is, the hollow portion 52) of the side frame 50. A specific example of joining the second joint flange 75 to the upper surface 41b of the case bottom portion 41 will be described in detail later.

The bend portion 76 is located at an intersection between the second joint flange 75 and the outer surface section 73 of the protrusion portion 71. That is, the protrusion portion 71 protrudes upward from the bend portion 76. The edge portion 55a of the first joint flange 55 is arranged below the bend portion 76. In the first joint flange 55, the edge portion 55a on the battery module 24 (battery 27) side extends to the bend portion 76 side. In the edge portion 55a, the first joint section 55b is joined from below to the lower surface 41a of the case bottom portion 41.

The third joint flange 77 extends inward in the vehicle width direction along the upper surface 41b of the case bottom portion 41 from a lower side of the inner surface section 74. The third joint flange 77 is joined to the upper surface 41b of the case bottom portion 41.

The battery frame 38 is formed in a hat shape in a cross-section of the protrusion portion 71, the second joint flange 75, and the third joint flange 77.

The second joint flange 75 and the third joint flange 77 are joined to the upper surface 41b of the case bottom portion 41, and thereby, the battery frame 38 is fixed to the upper surface 41b of the case bottom portion 41. In this state, the protrusion portion 71 forms a hollow cross-section (hollow closed cross-section) together with the case bottom portion 41. Therefore, the rigidity of the protrusion portion 71 is enhanced.

The protrusion portion 71 includes a plurality of recess sections 81 along the vehicle forward-rearward direction. The plurality of recess sections 81 are formed to be recessed downward from the top section 72 of the protrusion portion 71. The plurality of recess sections 81 are arranged to be spaced from each other in the vehicle forward-rearward direction. The top section 72 is located at a middle position in the vehicle width direction in the protrusion portion 71. Therefore, the rigidity of a region on the middle side in the width direction of the protrusion portion 71 is enhanced. The plurality of recess sections 81 are joined to a raised portion 83 of the case bottom portion 41 by spot welding or the like from above.

Here, the hollow portion 52 of the side frame 50 is formed to have high rigidity. That is, the protrusion portion 71 and the hollow portion 52 are formed to have higher rigidity than the collision absorption portion 78 between the protrusion portion 71 and the hollow portion 52 in the vehicle width direction. The collision absorption portion 78 is a region that accepts deformation with respect to a collision load which is input, for example, by a side collision. Therefore, when the collision load is input to the side frame 50, the collision absorption portion 78 interposed between the hollow portion 52 having high rigidity and the protrusion portion 71 having high rigidity can be suitably deformed by the collision load.

In the top section 72 of the protrusion portion 71, the battery module 24 (battery 27) is fastened to a vehicle width direction inner end section (that is, a vehicle width direction inner end section of the protrusion portion 71) 72*a*. That is, the battery module 24 is arranged within the battery pack 20 in a state of being supported by the vehicle width direction inner end section 72*a* of the protrusion portion 71.

The battery frame 38 includes a plurality of ridge lines 85 that continue to the outer surface section 73 and the second joint flange 75, extend in the vehicle width direction, and are spaced from each other in the vehicle forward-rearward direction. The plurality of ridge lines 85 are formed in a bead shape that is raised (protrudes) to an opposite side of the case bottom portion 41 from the outer surface section 73 and the second joint flange 75.

The second joint flange 75 includes a second joint section 75*a* between the ridge lines 85 that are adjacent to each other in the vehicle forward-rearward direction. The plurality of second joint sections 75*a* are arranged to be in contact with the upper surface 41*b* of the case bottom portion 41. The plurality of second joint sections 75*a* are joined to the upper surface 41*b* of the case bottom portion 41 by spot welding or the like. Here, the first joint section 55*b* of the first joint flange 55 is arranged to be separated by a distance L2 to the battery module 24 (battery 27) side from the second joint section 75*a* of the second joint flange 75.

The actions and effects of the vehicle body lower part structure according to the above-described embodiment are described below.

Figure 7:
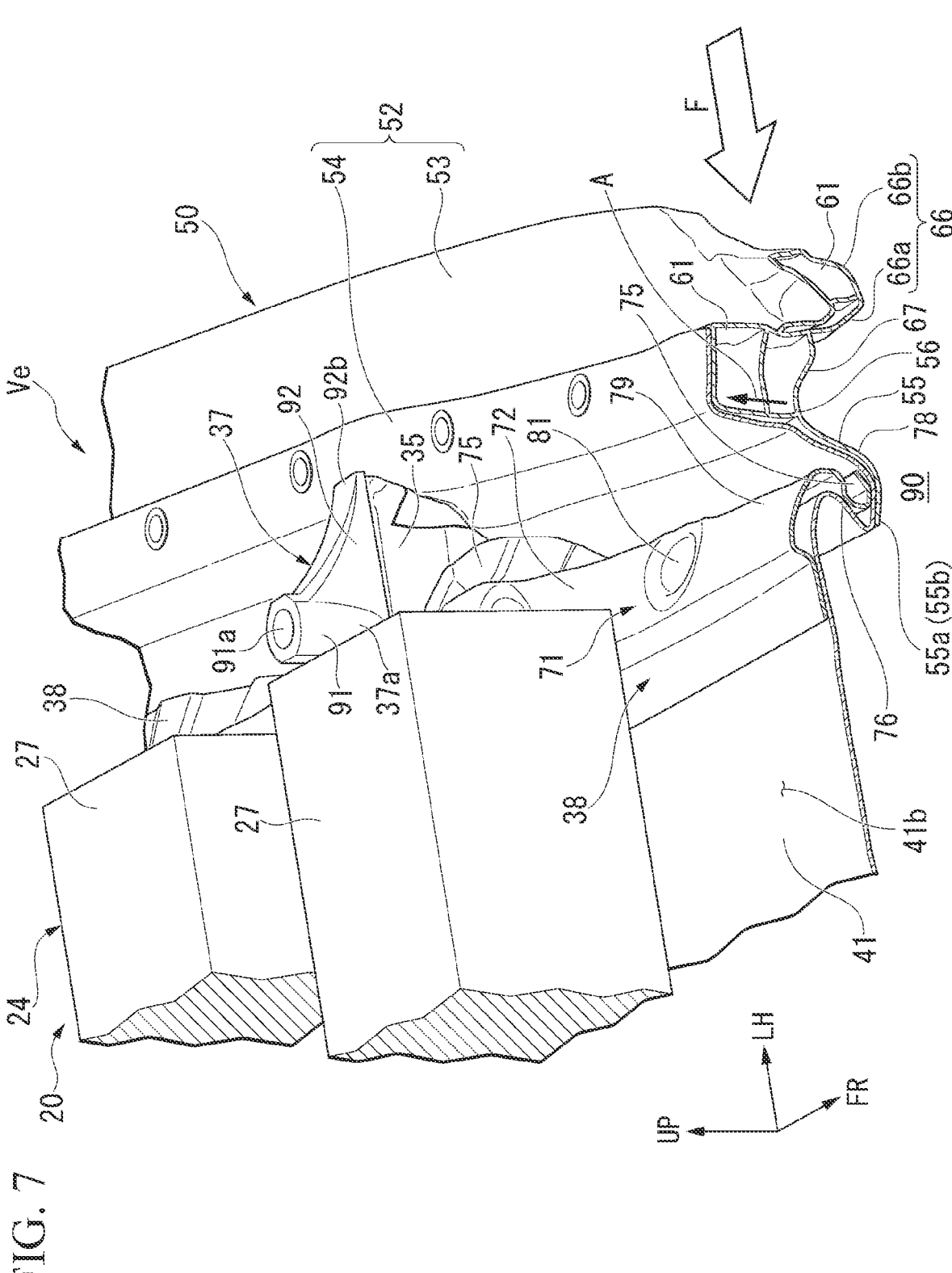
FIG. 7 is a perspective view that includes a partial cross-section showing a state in which a collision load is input by a side collision to the vehicle body lower part structure in the embodiment of the present invention.

FIG. 7 is a perspective view including a partial cross-section showing a state in which a collision load F is input by a side collision to the vehicle body lower part structure.

As shown in FIG. 2, FIG. 6, and FIG. 7, the battery pack 20 is connected to the side sill 12 via the side frame 50, and thereby, the battery pack 20 (in particular, the battery 27) is arranged to be separated inward in the vehicle width direction from the side sill 12. Therefore, for example, when the collision load F is input to the side sill 12 by a side collision such as a pole side collision, a region (for example, a region that includes the collision absorption portion 78 and the like) between the battery 27 and the side sill 12 is deformed by the collision load F, and it is possible to absorb collision energy. Thereby, it is possible to enhance the absorption efficiency of collision energy with respect to the collision load F input to the side sill 12. Therefore, according to the present vehicle body lower part structure, it is possible to improve collision safety performance, and it is possible to contribute to the development of a sustainable transportation system. Hereinafter, a side collision such as a pole side collision may be simply abbreviated as a "side collision".

The lower cross member 35 is connected to the floor portion 13 by the connection portion 37, and the connection portion 37 is provided at a left outer position in the vehicle width direction than the battery 27. Therefore, a left outer region (that is, a region between the battery 27 and the side sill 12 that includes the collision absorption portion 78 or the like) in the vehicle width direction than the battery 27 can be pressed from above via the lower cross member 35 by the connection portion 37.

Thereby, when the collision load F is input to the side sill 12 by the side collision, the connection portion 37 and the lower cross member 35 can prevent the side frame 50 that connects the battery pack 20 to the side sill 12 from being deformed upward. Accordingly, it is possible to prevent the side frame 50 from coming into contact with the battery 27.

As shown in FIG. 6 and FIG. 7, at least the section 37*a* of the connection portion 37 is provided at the position aligned with the battery frame 38 in the forward-rearward direction. Therefore, the connection portion 37 can prevent the battery frame 38 from being deformed upward by the collision load F. Accordingly, it is possible to prevent the battery frame 38 from coming into contact with the battery 27.

The connection portion 37 includes the first enlarged width section 92, and the first enlarged width section 92 extends leftward outward in the vehicle width direction. Thereby, the first enlarged width section 92 can prevent the battery frame 38 from being deformed upward by the collision load F.

By providing the first enlarged width section 92 on the connection portion 37, the connection main body section 91 of the connection portion 37 that connects the lower cross member 35 to the floor portion 13 can be arranged at an inner position in the vehicle width direction relative to the first enlarged width section 92. Thereby, it is possible to enhance the degree of freedom of design when the position of the connection main body section 91 is determined.

Additionally, the first enlarged width section 92 is formed to have a width that is enlarged leftward outward in the width direction toward the downward side. Therefore, the shape of the first enlarged width section 92 can be made small. The second enlarged width section 93 is formed to have a width that is enlarged inward in the width direction toward the downward side. Therefore, the shape of the second enlarged width section 93 can be made small. Thereby, the weight of the connection portion 37 (that is, the vehicle Ve) can be reduced, and it is possible to contribute to ensuring of a cruising distance of the vehicle Ve.

By forming the second enlarged width section 93 to have a width that is enlarged inward in the width direction toward the downward side, the second enlarged width section 93 can be in contact with the lower cross member at the inside in the vehicle width direction. Additionally, the first enlarged width section 92 extends further greatly in the vehicle width direction than the second enlarged width section 93. Thereby, it is possible to further enhance the rigidity of the connection portion 37 against the collision load F. Accordingly, the first enlarged width section 92 can further favorably prevent the battery frame 38 from being deformed upward by the collision load F.

By forming the hollow cell 61 in the hollow portion 52 of the side frame 50, the rigidity of the hollow portion 52 is enhanced. The battery frame 38 (that is, the second connection flange 75) is arranged to be separated inward in the vehicle width direction by the distance L1 from the hollow portion 52. The first enlarged width section 92 of the connection portion 37 extends further leftward outward in the vehicle width direction than the flange outer end portion 75b of the second connection flange 75. Therefore, the first enlarged width section 92 of the connection portion 37 can extend to a position close to the hollow portion 52 of the side frame 50. Thereby, for example, the first enlarged width section 92 can further favorably prevent the hollow portion 52 of the side frame 50 from being deformed upward by the collision load F due to a side collision.

On the other hand, when the collision load F of the side collision is input, in a vehicle body forward-rearward direction, a region (for example, a region that includes the collision absorption portion 78 and the like) between the battery 27 and the hollow portion 52 excluding the connection portion 37 can be deformed to be capable of absorbing the collision energy in a state where upward deformation is prevented. That is, it is possible to ensure a deformation stroke required for absorbing the collision energy by the region between the battery 27 and the hollow portion 52 excluding the connection portion 37.

Thereby, when the collision load F of the side collision is input, the first enlarged width section 92 can prevent the hollow portion 52 from being deformed upward and coming into contact with the battery 27. Additionally, the region (region that includes the collision absorption portion 78 and the like) between the battery 27 and the hollow portion 52 excluding the connection portion 37 is deformed, and the collision energy can be absorbed.

Here, the connection portion 37 is formed to have high rigidity in order to support the battery pack 20 to the floor portion 13. Therefore, for example, it is conceivable that when the enlarged width outer end portion 92b of the first enlarged width section 92 is in contact with the hollow portion 52, the collision load F at a collision initial stage in a side collision may be input through the connection portion 37 to the arrangement position of the battery 27.

Therefore, the enlarged width outer end portion 92b of the first enlarged width section 92 is arranged to be separated inward in the vehicle width direction from the hollow portion 52. Thereby, when the collision load F is input by the side collision, the collision load F that is input to the arrangement position of the battery 27 at the collision initial stage of the side collision can be reduced in addition to preventing upward deformation of the hollow portion 52 of the side frame 50.

The second joint flange 75 and the first joint flange 55 are arranged at a further inner side in the vehicle width direction than the enlarged width outer end portion 92b of the first enlarged width section 92 such that the second joint flange 75 overlaps the upper side of the first joint flange 55. Therefore, the first connection flange 55 can be pressed from above by the second connection flange 75 and the first enlarged width section 92. Here, the collision absorption portion 78 that includes the first joint flange 55 and the second joint flange 75 are formed to accept deformation with respect to the collision load F.

Thereby, for example, when the collision load F is input to the first joint flange 55 of the side frame 50 by a side collision, the collision absorption portion 78 between the hollow portion 52 of the side frame 50 and the battery 27 can be deformed downward.

A space 90 that receives deformation of the collision absorption portion 78 can be ensured below the collision absorption portion 78. Thereby, it is possible to prevent a section that is not collapsed from being generated at the collision absorption portion 78, and it is possible to enhance the absorption efficiency of collision energy. By deforming the collision absorption portion 78 downward, it is possible to prevent the collision absorption portion 78 from coming into contact with the battery 27 arranged within the battery pack 20.

The edge portion 55a of the first joint flange 55 extends to the bend portion 76 side (that is, to the inside in the vehicle width direction) of the battery frame 38, and the first joint section 55b (also refer to FIG. 4) of the edge portion 55a is joined to the lower surface 41a of the case bottom portion 41. Therefore, the collision load F can be transmitted to the bend portion 76 of the battery frame 38 and the case bottom portion 41.

Thereby, the bend portion 76 can be a base point of folding with respect to the collision load F. The first joint flange 55 can be further reliably deformed (bent) downward together with the case bottom portion 41 and the battery frame 38 (in particular, the second connection flange 75).

Additionally, the second joint section 75a (also refer to FIG. 4) of the second joint flange 75 is joined to the upper surface 41b of the case bottom portion 41, and the first joint section 55b is arranged closer to the battery 27 (that is, at the inside in the vehicle width direction) than the second joint section 75a. The second joint flange 75 is arranged at the upper side of the case bottom portion 41, and the first joint flange 55 is arranged at the lower side of the case bottom portion 41. Thereby, it is possible to prevent the first joint flange 55 and the case bottom portion 41 from coming into contact directly with the battery 27.

Specifically, for example, it is also conceivable that when an excessive collision load is input to the first joint flange 55 of the side frame 50 by a side collision, the first joint flange 55 may be deformed upward. Even in this case, the edge portion 55a (that is, the first joint section 55b) is in contact with the battery frame 38 via the case bottom portion 41. Therefore, the battery frame 38 can prevent the first joint flange 55 from being greatly deformed upward. Thereby, the battery 27 can be protected by the battery frame 38.

By including, on the top section 72 of the protrusion portion 71, the recess section 81 that is joined to the raised portion 83 of the case bottom portion 41, the recess section 81 can be arranged at the middle side in the width direction of the protrusion portion 71. Therefore, the rigidity at the middle side in the width direction of the protrusion portion 71 can be enhanced by the recess section 81, and a strength difference can be provided relative to an outer region (that is, a region on the bend portion 76 side) in the width direction. Thereby, the bend portion 76 can be further reliably used as a base point of folding, and the first joint flange 55 can be further reliably deformed (bent) downward.

The horizontal portion 53 and the vertical portion 54 of the side frame 50 are formed as the hollow portion 52 having a substantially L shape in a cross-section, and the plurality of hollow cells 61 are included in the hollow portion 52. The hollow portion 52 is formed to have high rigidity against the collision load F that is input by a side collision. Therefore, by separating the second joint flange 75 of the battery frame 38 inward in the vehicle width direction by the distance L1 relative to the vertical portion 54 (that is, the hollow portion 52), the battery frame 38 and the hollow portion 52 can be spaced from each other. Thereby, a deformation margin of the collision absorption portion 78 against the collision load F that is input by the side collision can be suitably ensured, and it is possible to further increase the absorption amount of collision energy.

Further, the thickness T1 of the inner region 66a is formed to be thinner than the thickness T2 of the outer region 66b.

Therefore, when the collision load F is input by a side collision, the inner region 66a on the vertical portion 54 side can be actively deformed at the lower surface section 66 of the horizontal portion 53 by the collision load F. Therefore, a boundary portion 56 between the vertical portion 54 and the first joint flange 55 can be deformed upward by the collision load F as shown by an arrow A. The boundary portion 56 is a region that substantially corresponds to the inner portion 67a of the lower surface section 67 in the vertical portion 54.

In this way, by deforming the boundary portion 56 upward by the collision load F as shown by the arrow A, the side frame 50 can be suitably deformed, and it is possible to further increase the absorption amount of collision energy.

Additionally, the lower surface section 66 of the horizontal portion 53 is arranged at a lower position than the case bottom portion 41. Therefore, it is possible to prevent the hollow portion 52 of the side frame 50 from falling to the room inside (that is, inward in the vehicle width direction) by the collision load F that is input by a side collision. Thereby, the first joint flange 55 of the side frame 50 can be further reliably deformed downward.

MODIFICATION EXAMPLE

Figure 8:
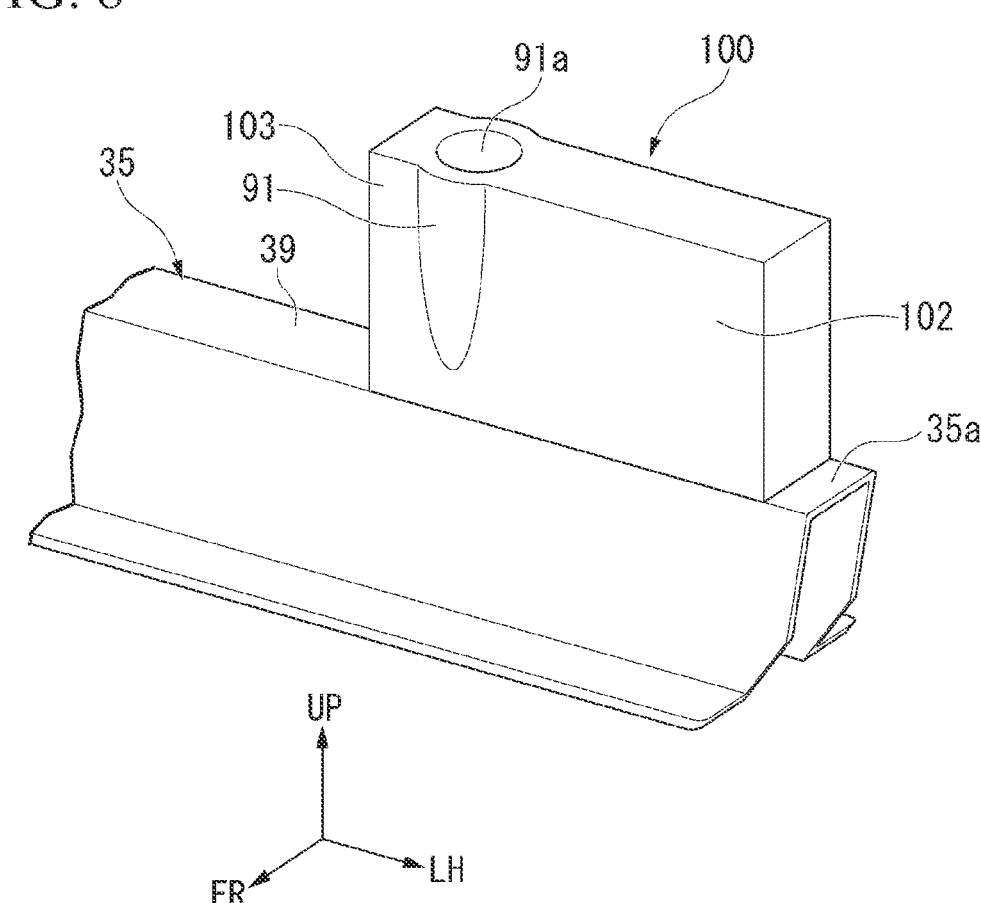
FIG. 8 is a perspective view showing a connection portion in a modification example.

Next, a connection portion 100 of a modification example is described based on FIG. 8. In the modification example, a portion that is identical or similar to the connection portion 37 of the embodiment is given by the same reference numeral, and detailed description thereof is omitted.

FIG. 8 is a perspective view showing the connection portion 100 in the modification example.

As shown in FIG. 8, the connection portion 100 includes: the connection main body section 91; a first beam section (beam section) 102 that extends outward in the vehicle width direction from the connection main body section 91; and a second beam section 103 that extends inward in the vehicle width direction from the connection main body section 91. That is, the connection portion 100 is a portion in which the first enlarged width section 92 is replaced with the first beam section 102, and the second enlarged width section 93 is replaced with the second beam section 103.

As shown in FIG. 6 to FIG. 8, the connection portion 100 includes the first beam section 102, and the first beam section 102 extends leftward and outward in the vehicle width direction. Thereby, the first beam section 102 can prevent the battery frame 38 from being deformed upward by the collision load F.

By providing the first beam section 102 on the connection portion 100, the connection main body section 91 of the connection portion 100 that connects the lower cross member 35 to the floor portion 13 can be arranged at an inner position in the vehicle width direction relative to the first beam section 102. Thereby, it is possible to enhance the degree of freedom of design when the position of the connection main body section 91 is determined.

The second beam section 103 extends inward in the width direction, and thereby, the second beam section 103 can be in contact with the lower cross member 35 at the inside in the vehicle width direction. Additionally, the first beam section 102 extends further greatly in the vehicle width direction than the second beam section 103. Thereby, it is possible to further enhance the rigidity of the connection portion 100 against the collision load F. Accordingly, the first beam section 102 can further favorably prevent the battery frame 38 from being deformed upward by the collision load F.

The modification example is described using an example in which the connection portion 100 is formed of the connection main body section 91, the first beam section 102, and the second beam section 103. However, the connection portion 100 may be formed of only the connection main body section 91. Alternatively, the connection portion 100 may be formed of the connection main body section 91 and the first beam section 102.

The technical scope of the present invention is not limited to the embodiments described above, and various changes can be made without departing from the scope of the present invention.

For example, the above embodiment is described using an example in which the floor portion 13 is the upper member; however, another member may be the upper member.

The components in the embodiments described above can be appropriately replaced with well-known components without departing from the scope of the present invention, and the modification examples described above may be suitably combined.

What is claimed is:

1. A vehicle body lower part structure, comprising:
   a side frame that connects a battery pack which is arranged below an upper member of a vehicle to a side sill which is provided at a further outer position in a vehicle width direction than the battery pack;
   a cross member that is provided within the battery pack, is arranged between batteries, and extends in the vehicle width direction;
   a connection portion that is provided within the battery pack and connects the cross member to the upper member,
   wherein the connection portion is provided at a further outer position in the vehicle width direction than the batteries; and
   a battery frame that connects the batteries of the battery pack and extends in a vehicle forward-rearward direction, wherein
   at least part of the connection portion is provided at a position aligned in the vehicle forward-rearward direction with the battery frame,
   the connection portion comprises a beam section that extends outward in the vehicle width direction,
   the beam section is an enlarged width section having a width that is enlarged outward in a width direction toward a downward side,
   the side frame comprises a hollow portion in which a hollow cell is formed,
   the battery frame is arranged to be separated inward in the vehicle width direction from the hollow portion, and
   the enlarged width section extends further outward in the vehicle width direction than an outer end portion in the vehicle width direction of the battery frame.

2. The vehicle body lower part structure according to claim 1,
   wherein the connection portion comprises, in addition to the enlarged width section, another enlarged width section having a width that is enlarged inward in the width direction toward the downward side, and
   the enlarged width section extends further in the vehicle width direction than the another enlarged width section extends in the vehicle width direction.

3. The vehicle body lower part structure according to claim 1, wherein an outer end portion in the vehicle width direction of the enlarged width section is arranged to be separated from the hollow portion.

4. The vehicle body lower part structure according to claim 1, wherein the side frame comprises a first joint flange that is joined to the battery pack, and the first joint flange is arranged at a further inner side in the vehicle width direction than the outer end portion in the vehicle width direction of the enlarged width section such that a second joint flange that is joined to the battery pack of the battery frame overlaps an upper side in an upward-downward direction of the first joint flange.

5. The vehicle body lower part structure according to claim 4, wherein the battery frame comprises a protrusion portion that protrudes upward from a bend portion formed on an inner end portion in the vehicle width direction of the second joint flange, an edge portion on the battery side of the first joint flange extends to the bend portion side, and the edge portion comprises a first joint section that is joined to the battery pack.

6. The vehicle body lower part structure according to claim 5, wherein the second joint flange comprises a second joint section that is joined to the battery pack, and the first joint section is arranged closer to the battery than the second joint section.

7. The vehicle body lower part structure according to claim 5, wherein the protrusion portion of the battery frame comprises a plurality of recess sections that are joined to the battery pack along a vehicle forward-rearward direction.

8. The vehicle body lower part structure according to claim 4, wherein the side frame comprises: a horizontal portion that is fixed to a lower portion of the side sill; and a vertical portion that connects the horizontal portion to the first joint flange, the horizontal portion and the vertical portion are formed as a hollow portion having a substantially L shape in a cross-section that includes a plurality of hollow cells, and the second joint flange of the battery frame is arranged at a position that is separated inward in the vehicle width direction from the vertical portion.

9. The vehicle body lower part structure according to claim 8, wherein a lower surface of the horizontal portion is formed such that a thickness of an inner region formed on the vertical portion side is thinner than an outer region formed on an outside in the vehicle width direction.

10. The vehicle body lower part structure according to claim 8, wherein a lower surface of the horizontal portion is arranged at a lower position than a lower surface of the battery pack, a lower surface of the vertical portion is formed in an inclination form having an upward gradient toward the first joint flange from the lower surface of the horizontal portion, and the lower surface of the vertical portion connects the lower surface of the horizontal portion to the first joint flange.

\* \* \* \* \*